No. 833,310. PATENTED OCT. 16, 1906.
E. B. DEATLEY.
GRAIN LIFTING ATTACHMENT FOR HARVESTING MACHINES.
APPLICATION FILED NOV. 27, 1905.
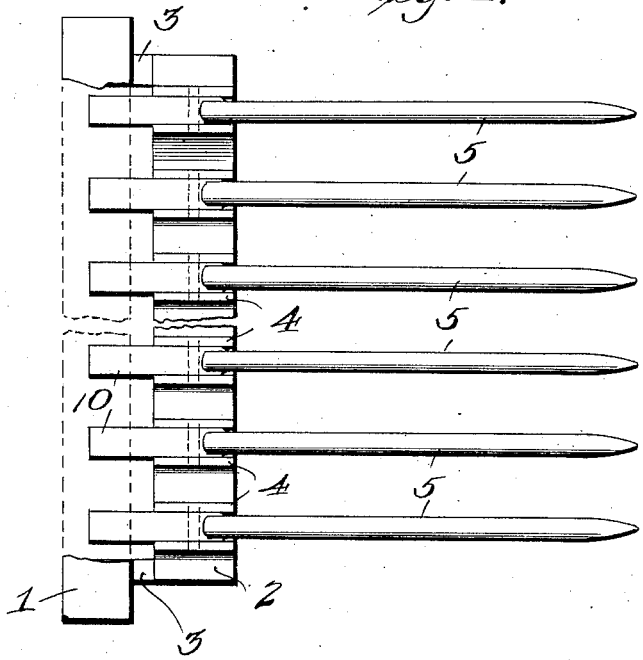
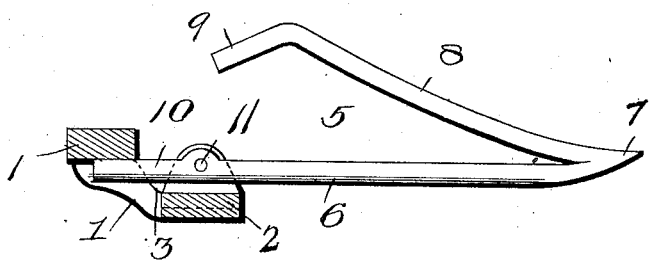
Witnesses
T. L. Mockabee
James F. Crown
E. B. Deatley
By Geo. S. Vashon
Attorney

UNITED STATES PATENT OFFICE.

ELZIE B. DEATLEY, OF SIDELL, ILLINOIS.

GRAIN-LIFTING ATTACHMENT FOR HARVESTING-MACHINES.

No. 833,310.　　　　Specification of Letters Patent.　　　　Patented Oct. 16, 1906.

Application filed November 27, 1905. Serial No. 289,293.

*To all whom it may concern:*

Be it known that I, ELZIE B. DEATLEY, a citizen of the United States, residing at Sidell, in the county of Vermilion and State of Illinois, have invented new and useful Improvements in Grain-Lifting Attachments for Harvesting-Machines, of which the following is a specification.

This invention relates to grain-lifting attachments for harvesting-machines, headers, and the like; and it consists of grain lifting or elevating fingers or members disposed in advance of the cutting apparatus and in close proximity to the latter to facilitate the raising of fallen grain and support the same in erect position while being cut and also adapted to prevent heavy grain from being tangled by the wind after it has been cut and while in the act of falling onto the platform-conveyer. The improved attachment also operates efficiently with the class of harvesting-machines embodying in their organization a reel.

The elevating-fingers, particularly embodying the features of the invention and located in advance of the cutting apparatus, are individually movable to conform to inequalities in the surface over which they move, and by this means the points thereof are protected by reason of the fact that they are prevented from being jammed into the ground while passing over ridges, hillocks, or other rough places.

In the drawings, Figure 1 is a top plan view of the improved attachment shown arranged in advance of and coöperating with a portion of a cutter-bar. Fig. 2 is a longitudinal vertical section of the attachment and cutter-bar, as shown by Fig. 1.

Similar numerals of reference indicate corresponding parts in the views.

The numeral 1 designates a cutter-bar, which in Fig. 1 is shown broken away for the purpose of illustration, the said cutter-bar in this instance being without the usual attachments of this class of devices in view of the fact that the invention does not in the least concern the cutting apparatus itself. Hence the cutter-bar 1 is conventionally outlined to assist in explaining the application and operation of the attachment. At a suitable distance in advance of the cutter-bar 1 a finger-supporting bar 2 is disposed and secured to remain in positive position in any suitable manner, but preferably attached to the cutter-bar by connecting members 3, which may be varied at will.

Disposed at regular intervals longitudinally of the supporting-bar 2 are a plurality of fulcrum members 4, consisting of longitudinally-slotted blocks, which may be cast integrally with bar 2 or attached thereto. Coöperating with the fulcrum members 4 are guard-fingers 5, each comprising a lower horizontal shank 6, continuing into a front pointed extremity 7, which is upturned, and an upwardly-inclined lifting member 8, also continuous with the pointed extremity 7 and formed with a downwardly-inclined rear terminal 9. The shank 6 of each finger has a rear flattened extension 10, snugly fitting in the longitudinally-slotted block or fulcrum 4 provided therefor, and held in said block by a pivot-pin 11, passing transversely therethrough and through the opposite sides of the block. The extension 10 is held high enough within its fulcrum or block 4 to permit rocking or tilting movement thereof, and the upper surface of the rear extremity of said extension normally bears against the under side of the cutter-bar 1 to prevent the shank 6 from being depressed below a predetermined level or to always hold the same in a true horizontal plane and in close proximity to the ground-surface over which the several fingers are propelled or moved. Each finger is free to move upwardly a sufficient distance to clear an obstruction that may come within the path of movement thereof or to pass over uneven portions of the ground-surface without liability of forcing the pointed extremity of the finger into the ground or in the least modifying the desired close arrangement or position of the shank 6 with respect to the ground-surface. By this arrangement each finger may move independently of the remaining similar devices and be effective in uplifting or elevating tangled or fallen grain irrespective of the irregularity of the surface over which it is moved and during the travel of the remaining fingers over a comparatively level surface. This operation not only insures a complete cutting of all the grain, but also an evenness in the cutting operation.

From the foregoing it will be understood that the essential feature of the invention resides in the independent movement of the fingers throughout the entire series of the latter, and this principle may be preserved in guard-finger organizations without relying upon the specific fulcrum means set forth.

What I claim is—

A grain-lifting apparatus for harvesting-machines comprising a cutter-bar, a supporting-bar secured to the cutter-bar and arranged in front of and below the same, said bars being also spaced apart, and longitudinally-slotted blocks, arranged in pairs at suitable distances apart on the supporting-bar, guard-fingers, each of which is pivoted between each pair of blocks, the rear portions of the guard-fingers having flattened extensions which project rearwardly beyond the pivot of said fingers, said rear extensions located above the supporting-bar below the cutter-bar, said extension serving to contact with the under side of the cutter-bar, and said extensions also serving to have a rocking movement in the space between the cutter-bar and the supporting-bar, substantially as specified.

In testimony whereof I affix my signature in presence of two witnesses.

ELZIE B. DEATLEY.

Witnesses:
J. C. McDOWELL,
MAX HOLTON.